(12) United States Patent
Matsunaga

(10) Patent No.: US 7,441,005 B2
(45) Date of Patent: Oct. 21, 2008

(54) INFORMATION SUPPLY SYSTEM USING COMMUNICATION LINE

(75) Inventor: Tatsuo Matsunaga, Kawasaki (JP)

(73) Assignee: IPEX Co., Ltd. (JP)

( * ) Notice: Subject to any disclaimer, the term of this patent is extended or adjusted under 35 U.S.C. 154(b) by 914 days.

(21) Appl. No.: 10/481,164

(22) PCT Filed: Jun. 22, 2001

(86) PCT No.: PCT/JP01/05380

§ 371 (c)(1),
(2), (4) Date: Dec. 18, 2003

(87) PCT Pub. No.: WO02/01820

PCT Pub. Date: Jan. 3, 2002

(65) Prior Publication Data

US 2004/0242220 A1 Dec. 2, 2004

(51) Int. Cl.
G06F 15/16 (2006.01)
H04N 7/167 (2006.01)
G06F 11/00 (2006.01)
H04L 9/00 (2006.01)

(52) U.S. Cl. .................. 709/207; 709/206; 709/203

(58) Field of Classification Search .................. 709/224; 725/108; 704/274
See application file for complete search history.

(56) References Cited

U.S. PATENT DOCUMENTS 5,249,230 A * 9/1993 Mihm, Jr. ................... 380/249
6,954,859 B1 * 10/2005 Simerly et al. .................. 726/3
2002/0073333 A1 * 6/2002 Palka et al. .................. 713/201

FOREIGN PATENT DOCUMENTS

| JP | 11-177719 | 7/1999 |
| JP | 11-275144 | 10/1999 |
| JP | 2000-341325 | 12/2000 |
| JP | 2001-060972 | 3/2001 |
| JP | 2001-111704 | 4/2001 |
| JP | 2002-009868 | 1/2002 |
| JP | 2002-239178 | 8/2002 |
| WO | WO 01/55992 | 8/2001 |

* cited by examiner

*Primary Examiner*—Frantz Jules
*Assistant Examiner*—Ashley D Turner
(74) *Attorney, Agent, or Firm*—Hayes Soloway P.C.

(57) ABSTRACT

An information supply enables a user to monitor a specific region, where a monitor terminal is installed, even from a place where he/she visits via a communication line using an information terminal such as the user's telephone or a personal computer.

28 Claims, 7 Drawing Sheets

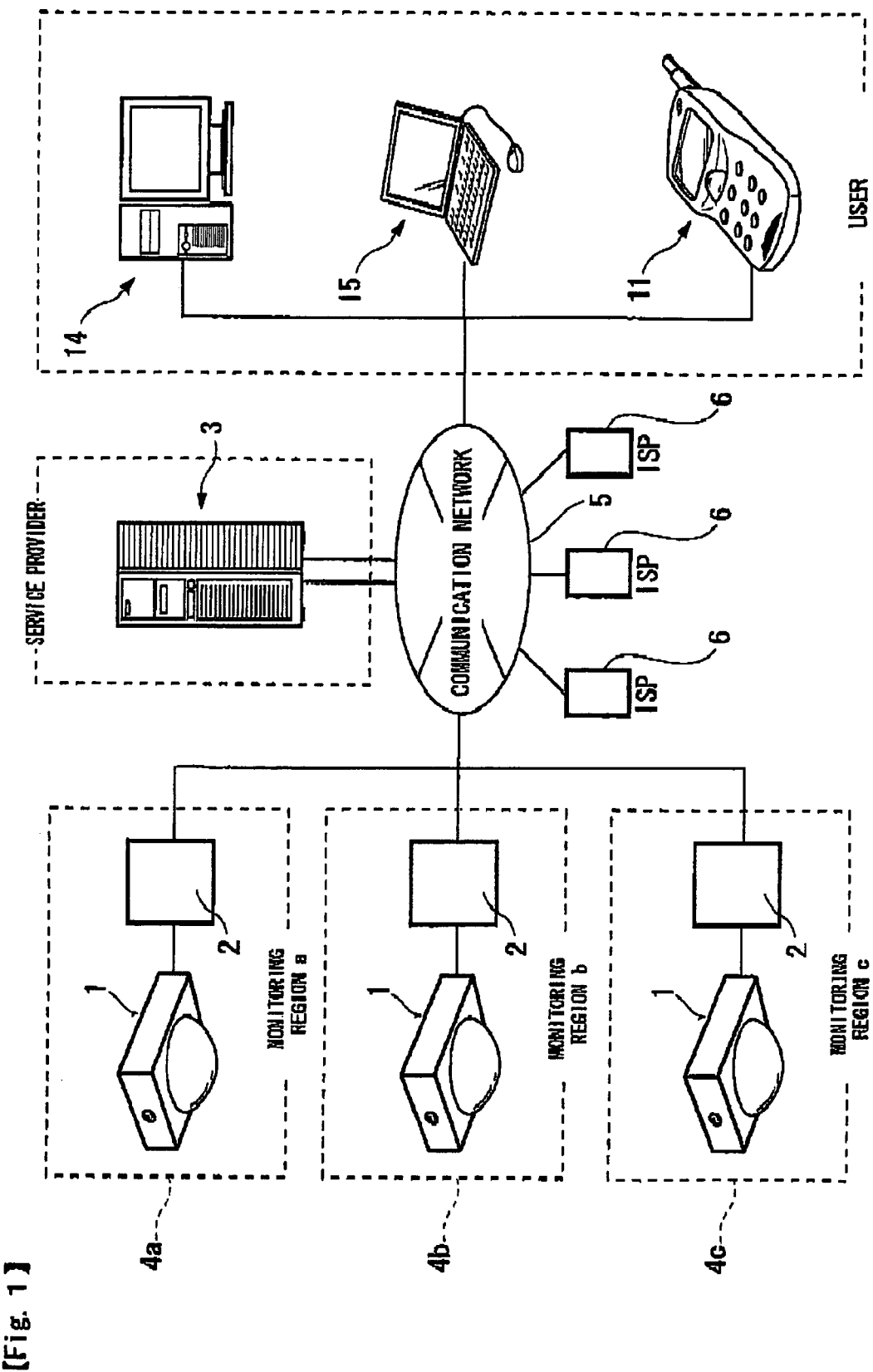
[Fig. 1]

[Fig. 2]
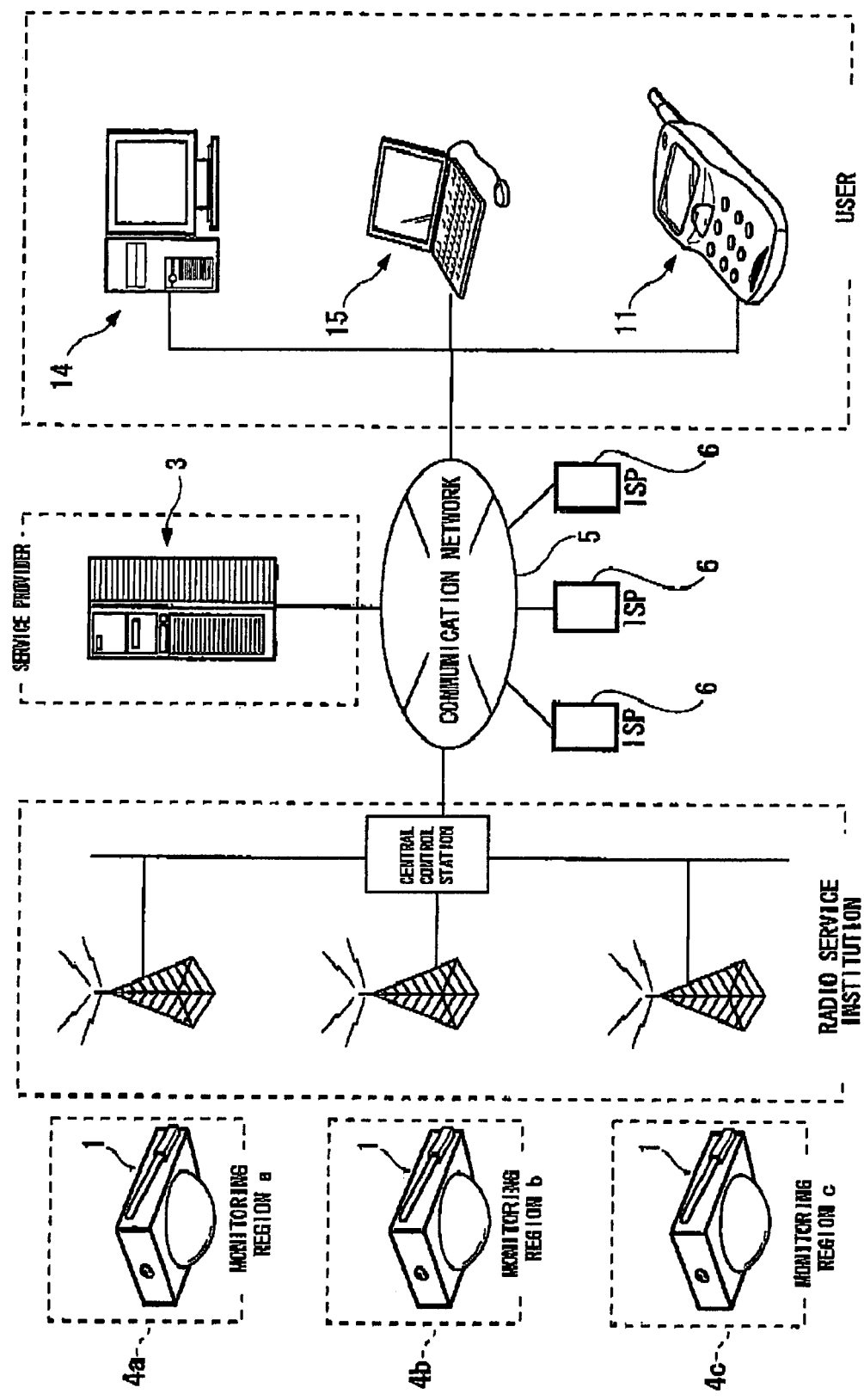

[Fig. 3]
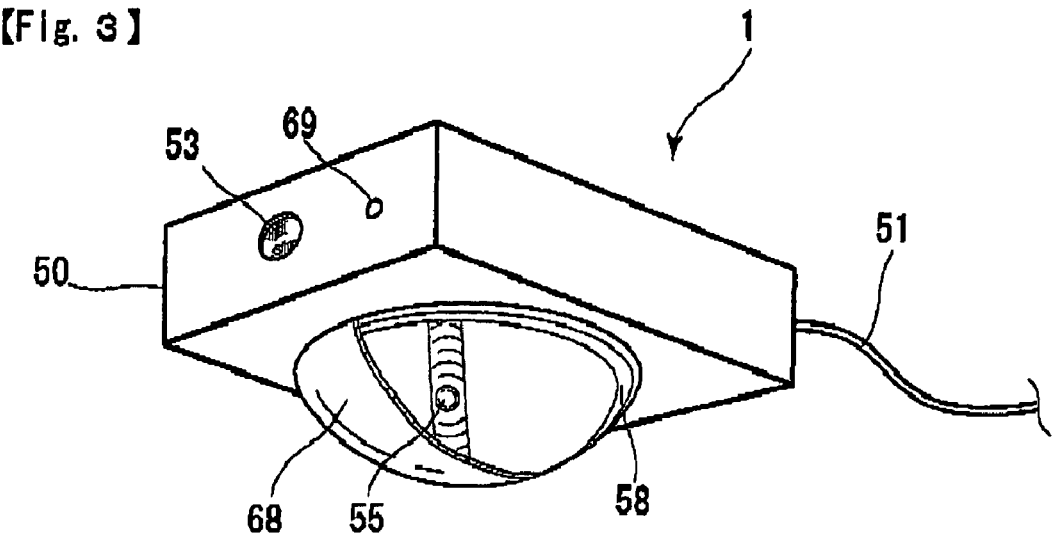
[Fig. 4]
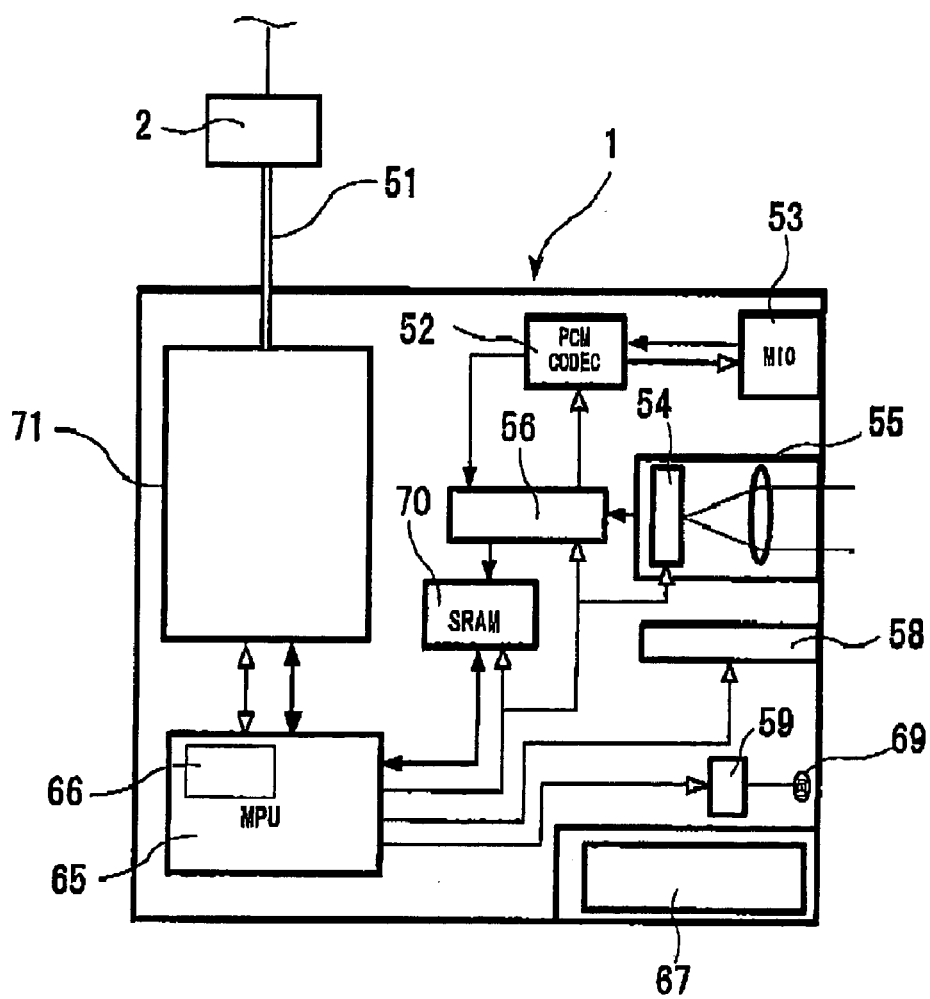

[Fig. 5]
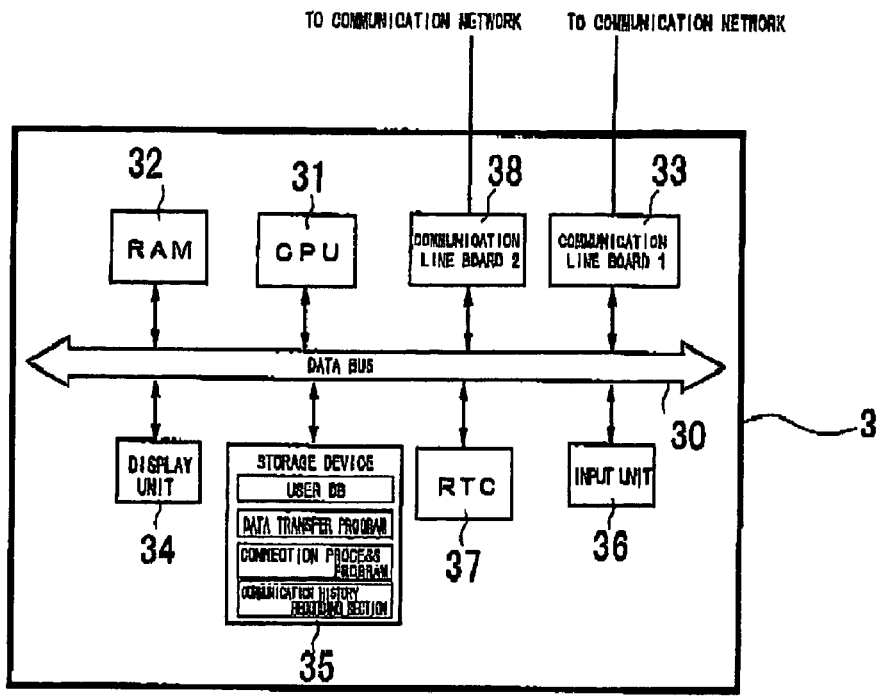
[Fig. 6]
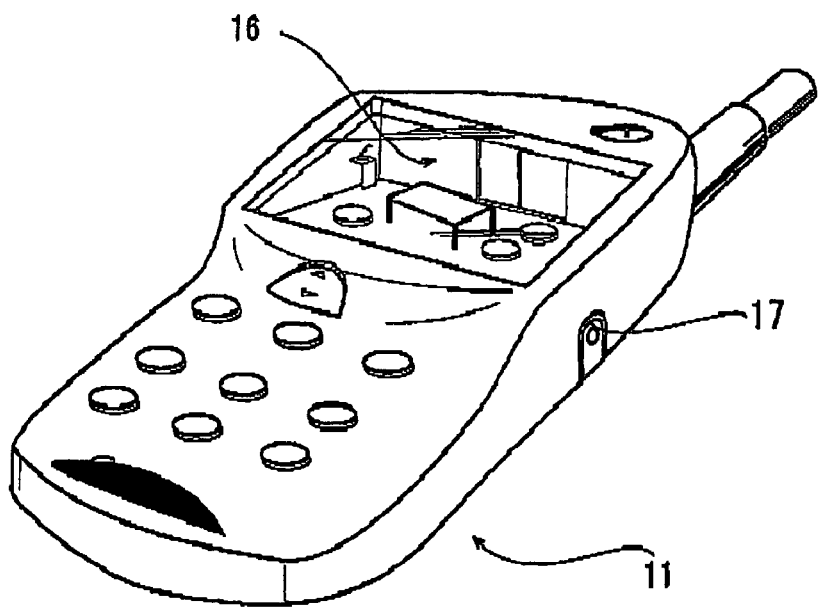

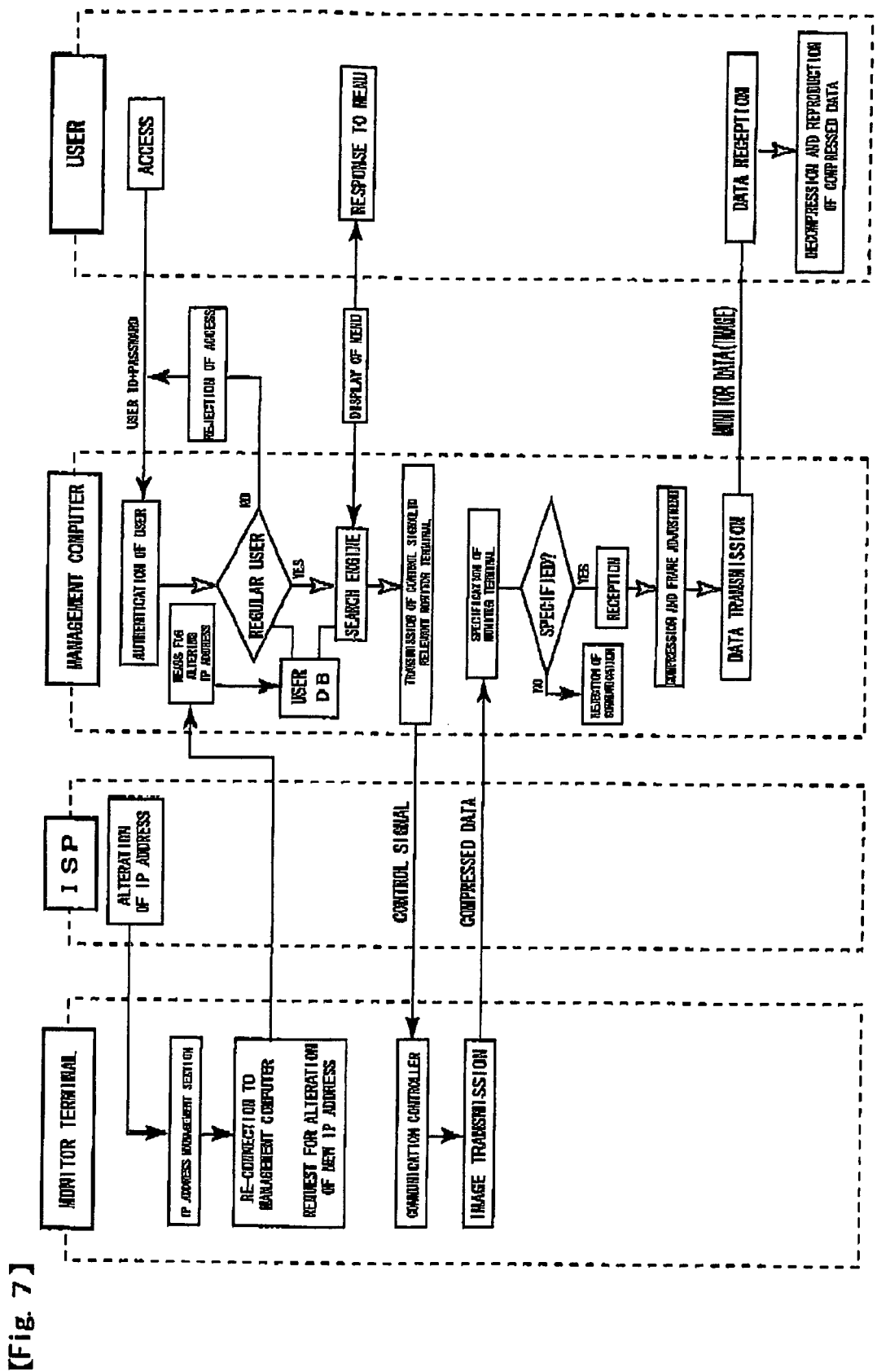
[Fig. 7]

[Fig. 8]
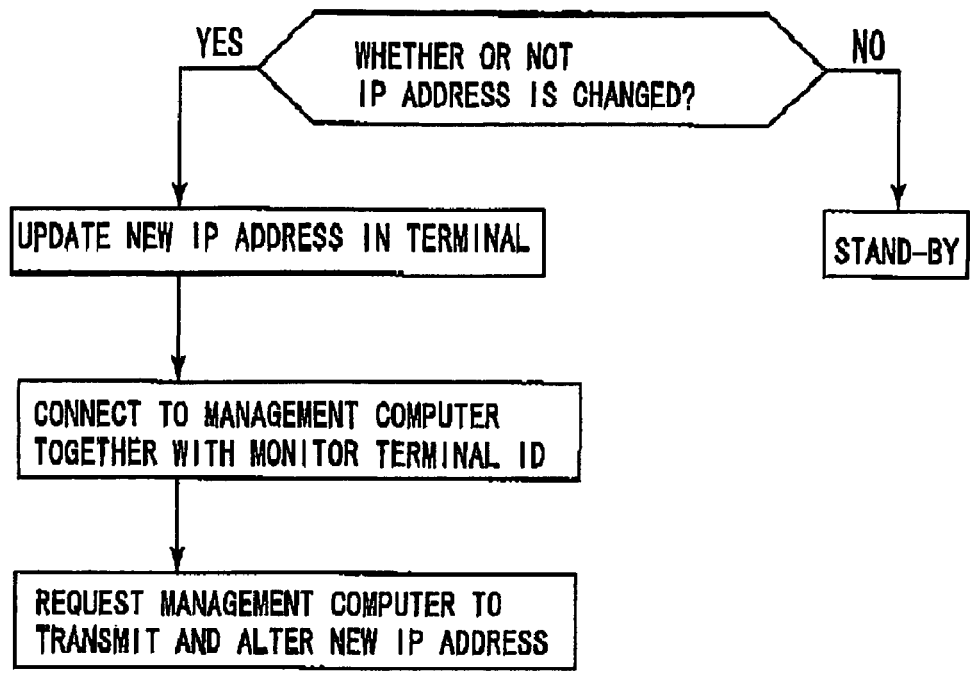
[Fig. 9]
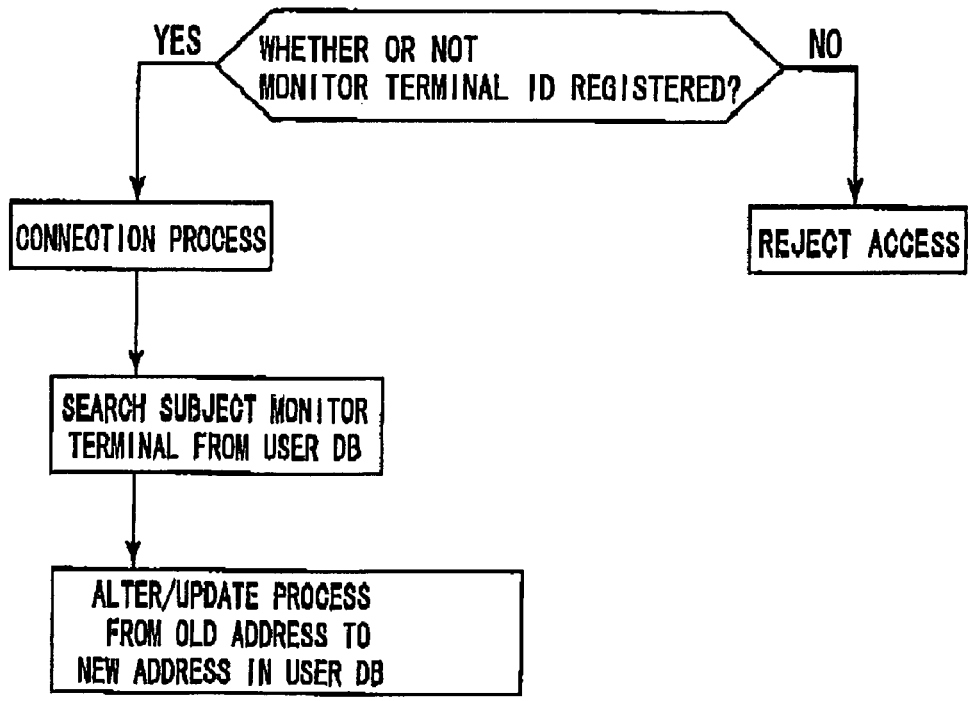

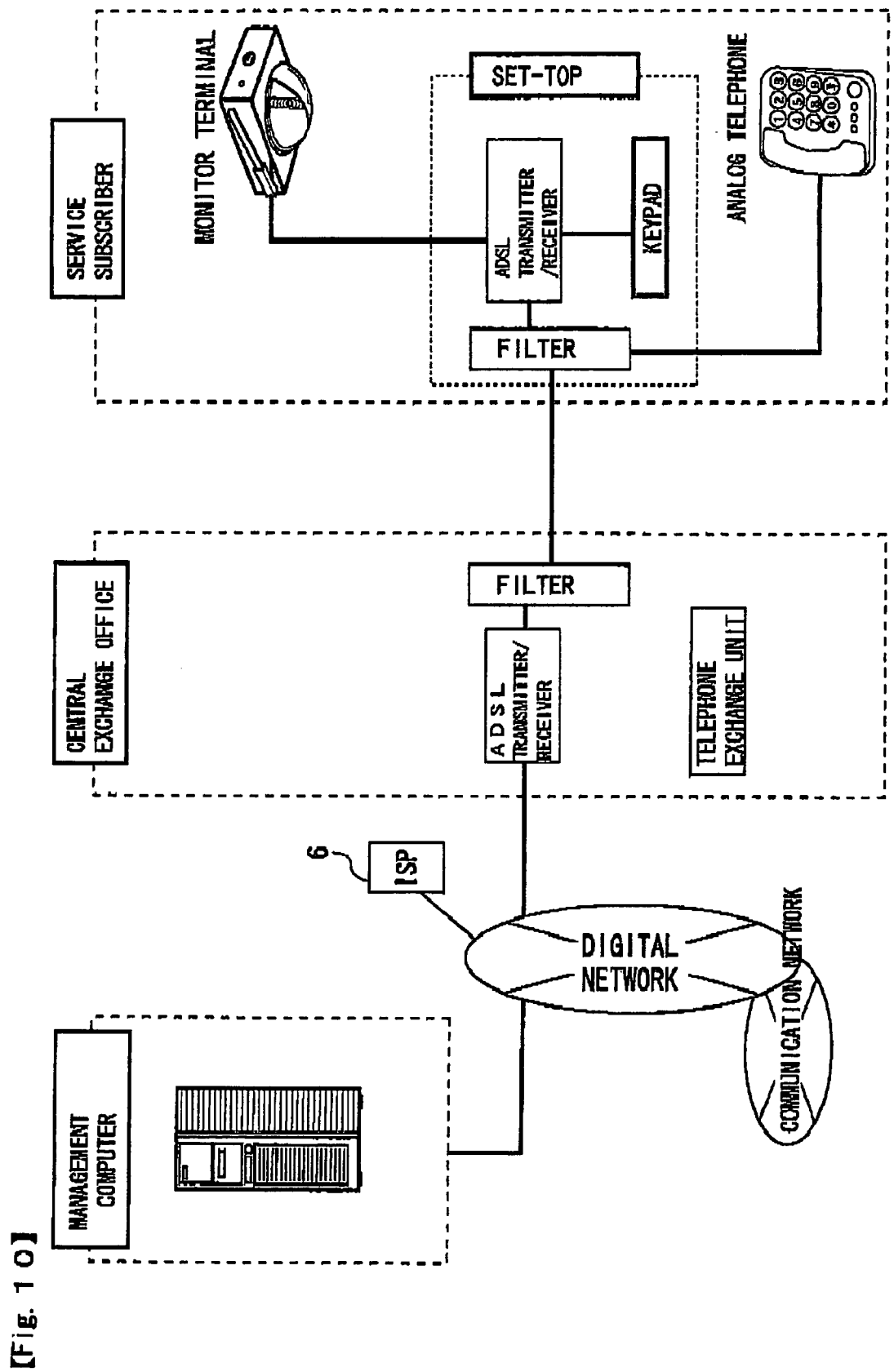
[Fig. 10]

INFORMATION SUPPLY SYSTEM USING COMMUNICATION LINE

TECHNICAL FIELD

The present invention relates to a monitor information supply method in a specific region, which enables a user to monitor the specific region, where a monitor terminal is installed, even from a place where he/she visits via a communication line using an information terminal such as a telephone that the user owns or a personal computer.

BACKGROUND ART

Conventionally, people have had to worry about burglary or fire control when they are absent from house, and today's deterioration of security situation further increases such worries. For this reason, more personal residences and companies make contract with security companies in recent years to carry out security service for them to prevent the occurrence of burglary, fire or the like.

As a current security system, there is a system where the security guards of a security company rush to a house on the notification to the security company by the activation of sensors if a burglar breaks into the house equipped with predetermined sensors or the like.

However, since personnel cost of the security guards has a very high proportion in such a system using manpower, a contract fee is expensive for common people, and further rapid increase of contracts cannot be expected as it stands.

Consequently, there is a request for monitoring how things are going in the specific region, that is, their houses for example, not only when they need or are worried but also frequently and intermittently by using a communication line (which includes cable and wireless).

However, these monitoring systems have a problem that privacy is not protected if someone other than a specific user accesses the monitor terminal via the communication line to acquire monitor information such as images of a monitoring region, and therefore, a system that prohibits a third party other than the specific user from acquiring the monitor information out of the monitor terminal has been much needed.

Accordingly, the present invention has been created on recognizing the above-described problems, and its object is to provide a monitoring system of a specific region, which makes it quite difficult for the third party other than the specific user to acquire the monitor information from the monitor terminal in spite of using an always-on connection line and which supplies necessary monitor information to a registered user very quickly.

DISCLOSURE OF THE INVENTION

To achieve the above-described object, the monitor information supply system of a specific region is an information supply system using a management computer that is installed in a communication network composed of the Internet and/or a telephone network, in which the management computer comprises; a user database where monitor terminal information including an IP address, which is attached to the monitor terminal(s) having at least one means out of a monitor camera, a monitor video-camera, a temperature monitor sensor, an audio monitor sensor and a smoke sensor, is registered by corresponding to a user ID. And said management computer comprises the following steps of: acquiring specific information that is the user ID composed of at least one of authentication data such as the telephone number, the ID number, the address data, the password and the code of a user who makes access using the communication network composed of the Internet and/or the telephone network; searching whether or not the acquired specific information corresponds to the monitor terminal information that is previously registered with the user database; reaching out the controller of the monitor terminal by the management computer based on an extracted monitor terminal information using the communication network composed of the Internet and the telephone network when the monitor terminal information corresponding to the specific information exists; acquiring information, which is collected by the monitor terminal, by the management computer via the communication network composed of the Internet and/or the telephone network; supplying the information acquired from the monitor terminal to the user, who has transmitted the specific information to make access, by the management computer using the communication network composed of the Internet and/or the telephone network; and accepting an IP address alteration request, which is transmitted from a specifiable monitor terminal, and altering the IP address that is a part of the monitor terminal information registered with the user database. The system can quickly update the user database depending on a status to respond the next access from the user.

Herein, when accepting the IP alteration request from the monitor terminal, it is preferable that the system has a step of accepting a monitor terminal ID registered with the user database and approving the IP alteration request only when the monitor terminal ID is registered, which achieves more accurate management of the user database.

When the IP address of the monitor terminal used in the system is replaced with another IP address in the always-on connection state, it is preferable that the monitor terminal has a detecting function of the difference between an old IP address and a newly provided IP address, and has a self connection function to connect to the global IP address of the management computer for itself, which is stored inside the terminal, if the IP addresses are different, the monitor terminal requests for the update registration of the new IP address based on a self monitor terminal ID. As another example, it is preferable that the monitor terminal, when the monitor terminal is capable of new connection or re-connection to the Internet, is provided with a function to connect to the global IP address of the management computer for itself, which is stored inside thereof, and has a self connection function to request for the update registration of a currently provided IP address based on the self monitor terminal ID. Further, as another example, it is preferable that the monitor terminal, when the IP address is altered by ISP while the monitor terminal is in the always-on connection state or when the monitor terminal is capable of re-connecting to the Internet, is provided with the function to connect to the global IP address of the management computer for itself, which is stored inside thereof, and has a self connection function to request for the update registration of the currently provided IP address based on the self old IP address. In the case of this example, the old IP address corresponding to the monitor terminal already exists in the user database, and the authentication of the monitor terminal can be performed using the address as well.

Furthermore, the management computer, on condition that an user accesses the computer and consequently there is a plurality of monitor terminals or monitor units corresponding to the user after searching the monitor terminal ID from the user database, displays the type and/or the menu regarding accessible monitor terminals or monitor units to the user to prompt him/her to select information he/she wants. Since the management computer does not need to obtain the information of all monitor terminals registered and only specified monitor terminals are accessible, the user does not need to have useless waiting time.

In the step of reaching out the controller of the monitor terminal by the management computer based on an extracted monitor terminal information using the communication network composed of the Internet and the telephone network when the monitor terminal information corresponding to the specific information exists, and acquiring information, which is collected by the monitor terminal, by the management computer via the communication line network composed of the Internet and the telephone network, it is preferable that the management computer transmits a preferable error notification to the user who has made access when the computer confirms a state where connection to the monitor terminal is impossible or a state where information from the monitor terminal is not transmitted to the management computer. Specifically, duration which the management computer waits for transmitted data is set as a predetermined time and session management is performed during a predetermined time, so that a message that no information has been obtained is sent to the user who made access without letting him/her to wait too long if data cannot be obtained within the waiting time, and thus improving service.

When the management computer acquires information, which is collected by the monitor terminal, via the communication network composed of the Internet and the telephone network, the transmitted information is compressed data of an image compressed by predetermined compression algorithm, and it is preferable that the management computer temporarily stores the compressed data in a storage device and transmits the data synchronously with the data transmission speed of the information terminal of the user, which supports any terminal type of the users.

BRIEF DESCRIPTION OF THE DRAWINGS

FIG. 1 is a block diagram showing the configuration of the monitoring system of a specific region in the embodiment of the present invention.

FIG. 2 is a block diagram showing the configuration of the monitoring system of a specific region in the embodiment of the present invention.

FIG. 3 is an external perspective view showing a monitor unit used in the embodiment of the present invention.

FIG. 4 is a block diagram showing the configuration of a monitor terminal used in the embodiment of the present invention.

FIG. 5 is a block diagram showing the configuration of a management computer used in the embodiment of the present invention.

FIG. 6 is an external view showing a cell phone as the information terminal that the user carries, which is used in the embodiment of the present invention.

FIG. 7 is a flow chart showing a monitor process flow in the specific region monitoring system of the first embodiment of the present invention.

FIG. 8 is a process flow chart of the monitor terminal in the embodiment of the present invention.

FIG. 9 is a process flow chart of the management computer in the embodiment of the present invention.

FIG. 10 is a block diagram showing a DSL that is communication means used in the embodiment of the present invention.

BEST MODE FOR CARRYING OUT THE INVENTION

The embodiment of the present invention will be described based on the drawings as follows.

Embodiment 1

Firstly, FIGS. 1 and 2 are the block diagrams showing the configuration of the monitoring system of a specific region in this embodiment, FIG. 3 is the external perspective view showing the monitor terminal used in this embodiment, FIG. 4 is the block diagram showing the configuration of the monitor terminal used in this embodiment, FIG. 5 is the block diagram showing the configuration of a management computer used in this embodiment, and FIG. 6 is the external view showing the cell phone that the user carries, which is capable of outputting monitored images and sound from the management computer in this embodiment.

Now, the monitoring system of a specific region in this embodiment mainly consists of monitor terminals 4 (4a, 4b, 4c, ... 4z, ... ) installed in regions to be monitored (a, b, c, ... z, ... ) of a place where each of a large number of registered users (A, B, C, ... Z, ... ) wants to monitor, that is, their houses for example, a management computer 3 that a service provider owns, which is data communicably connected via a communication network 5 to the monitor terminals 4 and the information terminals that the service users own, a relay server 6 as an internet service provider (ISP) that is basically in always-on connection with each monitor terminal, and the information terminal such as a personal computer 14, a laptop personal computer 15 and a cell phone 11, which is operated by the user of monitoring service, as shown in FIG. 1.

Further, the monitor terminals 4 (4a, 4b, 4c, ... 4z, ... ) used in this embodiment is basically in always-on connection with the management computer 3 that the service provider owns, mainly via the communication network 5, as shown in FIG. 1. According to the example, the monitor terminals 4a to 4c are connected to the management computer 3 via ADSL (DSL) that enables them to have always-on connection via a network, which is a so-called asymmetric digital subscriber line method, and the monitor terminals 4a to 4c consist of a set-top box 2, which is a communication device to execute the transmission/receiving of data, and a monitor unit 1 that is connected to the set-top box 2 and collects the monitor information such as the images and sound etc. in the specific region. Note that FIG. 2 is an example of communication configuration using wireless.

In the monitor unit 1 used in this embodiment, which is shown in FIG. 1, a transparent dome-shaped cover 68 is formed under a box-shaped case 50 that can be arranged on a ceiling or the like, a monitoring CCD camera 55 as monitoring means and a direction change unit 58, which can change the monitoring direction of the monitoring CCD camera 55 vertically and horizontally, are installed in the cover 68, communication cable 51 connected to the set-top box 2 is led out from one side of the case 50, and a microphone 53 that can collect sound in the monitoring region is further provided on the other side.

Further, as shown in FIG. 4, the configuration of the case of the monitor unit 1 consists of a communication section 71 that performs data communication, an SRAM 70 that is used as a work memory in a control performed by an MPU 65 (described later) and temporarily stores image data or sound data, which are compressed by a digital signal processor (DSP) 56 (described later), a PCM codec 52 that is an A/D converter, which is connected to the microphone 53 and transforms input sound into digital data, the monitoring CCD camera 55 with a built-in charge coupled device (CCD) 54 capable of outputting an image focused inside by lenses in digital data row, the digital signal processor (DSP) 56 that compresses the sound data and image data, which are output from the PCM codec 52 and the charge coupled device (CCD) 54, by a predetermined algorithm (method such as MPEG and JPEG etc.), the direction change unit 58 that moves the photographing direction of the monitoring CCD camera 55, a driver 59 that turns on a pilot lamp (LED) 69, and the MPU 65 that is connected to each of these sections as shown in FIG. 4 and executes processing such as the control of each section. The MPU 65 has an internal ROM 66 therein that stores a control program and the like, where control details executed by the MPU 65 such as activation and stop of the monitoring means (the monitoring CCD camera 55, direction change unit 58, microphone 53 and the like) and the peripheral devices of the monitoring means. Note that white arrows in FIG. 4 denote control signals and black arrows denote data signals.

A battery 67 as electric power means is mounted on the monitor unit 1 of this embodiment, and the unit is operatable by the battery so that the monitor unit 1 can be easily installed in a place where power is not available. However, the present invention is not limited to this, and the power may be used after converting an alternating current obtained from an outlet or the like into a predetermined direct current.

In this embodiment, the image data and sound data can be transmitted to the relay server 6 and the management computer 3 after conducting data compression to the data by the method such as MPEG using the DSP 56, and conducting data compression is preferable because transmission load is reduced by making the volume of data to be transmitted be small, the volume of communication required in the management computer 3 is reduced, and a line cost can be inexpensive, but the present invention is not limited to this.

Furthermore, although the monitoring CCD camera 55 and microphone 53 are provided as the monitoring means in this embodiment, the present invention is not limited to this. As the monitoring means, an infrared sensor capable of detecting infrared ray emitted from animals or the like, a thermometric monitoring sensor capable of measuring the ambient temperature of an installed position (including a fire monitoring sensor by temperature), a smoke monitoring sensor, and the like for example may be used, and the monitoring means to be used may be appropriately selected from various sensors which are well-known according to a monitor purpose.

Note that a preferable position, where the user can check the image, temperature, sound or smoke etc. of an area that he/she particularly wants to monitor, may be selected as the installing position of the monitor unit 1, and the ceiling or the like having less obstacles as shown in this embodiment is preferable because the monitoring direction is properly moved and thus more precise monitoring can be executed.

Next, as shown in FIG. 10, the configuration of the set-top box 2, which is communication means connected to the monitor unit 1 and also connected to the communication network 5 (ADSL line) to transmit/receive data to/from the management computer 3, is that it is provided with an ADSL transmitter/receiver to which the monitor terminal as the monitor unit 1 and a personal computer are connected and a terminal to which an analog telephone is connected, which are connected via a filter to a telephone line leading to a central exchange office. Herein, the data is allocated in the central exchange office either to a telephone exchange unit or an ADSL transmitter/receiver via a filter based on a frequency band. As described, this embodiment uses ADSL to make it possible to use always-on connection service at a fixed rate, and new image information is sequentially transmitted to the management computer 3.

Further, the monitor unit 1 of this embodiment has the communication section 71, the IP address is allocated to the monitor unit 1, and the IP address is used for identifying the monitoring region since the unit can be in the always-on connection state with the management computer 3.

Next, the images (and sound data), whose data have been compressed, and sent from each monitor terminal 4 (4a, 4b, 4c, . . . 4z, . . . ), which is composed of the monitor unit 1 and the set-top box 2, are transmitted by the Internet network via the relay server 6. And as shown in FIG. 5, the configuration of the management computer 3 receiving the said data has; a central processing unit (CPU) 31 which is capable of executing authentication process by connection from the user, processing for searching the IP address (global IP in this case) of the monitor terminal, which is registered corresponding to the user ID, and data transfer processing for transmitting received image and sound data to the information terminal of the user, that is, the cell phone 11 for example; a RAM 32 used as the work memory of the CPU 31; a display unit 34 such as a display; an input unit 36 such as a keyboard and a mouse; a real time clock (RTC) 37 capable of outputting current time information and calendar information such as day in the week of any date, which is used in registering the execution history or the like of the connection service; a communication line board for monitor terminal 38 capable of connecting a line through which data communication with the set-top box 2, which constitutes the monitor terminal, can be executed in a relatively high speed; a communication line board for user 33 capable of connecting a communication line through which data communication with the cell phone 11, which is the information terminal of the user, can be executed in a relatively high speed; and a storage device 35, a magnetic disc or a magneto-optical disc, stores the user database (DB) in which registered the user password corresponding to an identification code (ID), by which the user can be identified, and the corresponding above-described IP address attached to the monitor terminal, which is installed in a place where the user wants to monitor, (note that source data of ID is the telephone number, ID number, address data, password, code, fingerprint showing the difference of human body, or the like), and the data transfer program where the data transfer process details are described and the like. These above-mentioned installations are connected to a data bus 30 that transmits/receives data inside the computer in a relatively high speed, which is a computer relatively superior in processing capability.

Note that when access is made from the cell phone 11 or the like, which is the information terminal owned by the user, the communication line board 33 used in this embodiment transmits guidance that prompts the user to input the user ID and the password based on the digital data registered with the storage device 35. It is to be noted: on condition that the ID (global IP address, user ID) owned by the cell phone or the personal computer is sent after overlaid by an access signal and the management computer 3 can receive the ID data, it can search the authority of the user and the monitor terminal corresponding to the user without placing a burden to the user. In addition, predetermined guidance can be transmitted in sound to the user who is a calling party, and this case, an A/D converter (not shown) that can transmit the digital data of sound after converting into analog sound may be provided.

Furthermore, the communication line board 33 may be provided with a call ID detecting section (not shown) as telephone information receiving means that takes out the telephone number data of those who made access, where the telephone number data of those who made access is output to the central processing unit (CPU) 31 and thus the user ID can be confirmed.

Further, the information terminal that the user uses in the present invention may be enough to have the functions that accesses the management computer 3 to receive the image data and the sound data at least, whose data have been compressed, and that can reproduce/output after decompressing the compressed data. In this embodiment, the user can access the management computer 3 from any one of the personal computer 14, the laptop personal computer 15 and the cell phone 11 to acquire the image data and sound data from the monitor terminal 1, and thus monitoring is executed, as shown in FIGS. 1 and 2. The cell phone 11 used in this embodiment has a relatively large display screen 16 that can display the monitored image and installs a micro-computer that can execute decompression process of the compressed data, by which the user can hear sound while watching a screen on connecting an earphone to an earphone terminal port 17, as shown in FIG. 6.

In the following, the flow of the monitor process in the monitoring system of this embodiment based on FIG. 7 will be described. User A, when he/she becomes anxious about the status of his/her house, where the monitor terminal 1 is installed, at a place he/she has visited or the like, the user accesses the management computer 3, which the monitoring service provider owns, from the cell phone 11 that he/she owns via the Internet, for example, and inputs his/her user ID and password according to guidance by operating the cell phone 11. Note that when the ID (global IP address, user ID) owned by the cell phone or the personal computer is sent after overlaid by the access signal and the data reaches the management computer 3 when access is made to the management computer 3, the user does not need to perform authentication process according to particular guidance.

The management computer 3 compares the user ID and password, which have been transmitted from the cell phone 11 of user A, with the registered data in the user DB stored in the storage device 35. In a consequence of the comparison, the user A is detected and determined as a registered user, the management computer searches whether or not there are a plurality of monitor terminals or monitor units corresponding to the user, and when there are a plurality of them, the computer displays the type and/or the menu regarding the accessible monitor terminals or monitor units for the user to prompt him/her to select information he/she wants. In this case, since the management computer does not need to obtain the information of all monitor terminals registered and only a specified monitor terminal is accessible, the user does not need to have useless waiting time. Subsequently, searching is performed with a search engine using the user DB to extract the IP address (address that in always-on connection ISP allocates) of the monitor terminal, which is registered with the user DB while corresponding to the user ID, and when the monitor terminal 4a corresponds to user A for example, the computer transmits a particular control signal (command data) to the IP address of the monitor terminal, which is the monitor unit 1 that constitutes the corresponding monitor terminal 4a in this case, using the Internet line in an always-on connection state. Although the control signal may be any signal as long as it is a request signal that instructs to collect information such as images and to send them to the management computer, it is preferable that the signal is encrypted to prevent unauthorized access and decrypted in the monitor terminal. Specifically, it may be a system where the management computer 3 intercommunicates with the communication controller of the monitor terminal 4a, which is an MPU 65 in FIG. 4, and request the images. Note that when there is a plurality of the monitor terminals corresponding to user A, the type and/or the menu of accessible monitor terminals are displayed to the user to prompt him/her to select information he/she wants. Although it will be described later, a plurality of the monitor terminals could be connected to one communication section.

In the monitor unit 1 that has received the control signal (command data) and determined that it is the request from a regular management computer, the image data photographed by the monitoring CCD cameras 55 that are in an activated state and the sound data that is collected by the microphones 53 and digitized by the PCM codec 52 are transformed by the DSP 56 into compressed data using the MPEG method (JPEG method etc.) that is a predetermined data compression method, the compressed data is sent from the communication section 71 to the set-top box 2, and further sent to the management computer 3 via the Internet network through the communication line board for monitor 38.

As described in this embodiment, when the monitoring means such as the monitoring CCD camera 55 is activated on receiving the activation command data, the power consumption of the monitor unit 1 can be drastically reduced, which is preferable. However, the present invention is not limited to this, and in the case where the monitoring means has low power consumption, sufficient power is supplied as the operating power for the monitor unit 1, or the like, the monitoring means of the monitor unit 1 is set to an always-on operation state. However, since significant load is applied to the management computer if the image data or the like is constantly transmitted to the management computer, the data is transmitted only when necessary.

In this example, the monitor unit 1 and the management computer are connected via the relay server 6 because a permanently fixed IP address does not exist in the monitor unit, and the relay server 6 assures a specific IP address for the monitor unit to enable it to intercommunicate with the address of the management computer, that is, the IP address toward the Internet network, as a general always-on connection ISP operation. The communication line board for monitor terminal 38 and the CPU 31 of the management computer 3 identify each monitor terminal 4 connected, and with transmission of the control signal as the command data from the management computer 3, the image information or the like transmitted from each monitor terminal 4 is processed using the user database (DB) with which the IP address and the predetermined ID allocated to the monitor terminal are registered. Note that communication is rejected to unidentified information from the monitor terminal.

In short, regarding the image information or the like from the predetermined monitor terminal 4a that the management computer 3 has originally called, the data is transmitted based on the IP address and the predetermined ID, which are allocated to the monitor terminal, to a corresponding person who made access (user A). Note when the management computer and the monitor terminal are always connected via the Internet and in a communicating state with each other on intercommunication, it is clear that they can exchange various commands after the command data.

The compressed data including images and sound, that has been transmitted from the monitor terminal 4a, is temporarily stored (accumulated) in the storage device 35. In addition the type information of the information terminal (such as cell phone and personal computer etc.) that made access via the communication line board 33 is collected, and a size of image is adjusted to the frames size of the information terminal of those who made access (user A in this case), based on the type information (such as cell phone and personal computer etc.), and further, the temporarily stored (accumulated) compressed data is converted into an appropriate file format such as C-HTML for the cell phone and HTML for the personal computer based on said collected type information and transmitted to the information terminal of the user.

Further, when the management computer acquires the information collected by the monitor terminal 4 via the communication line network composed of the Internet and telephone network, the transmitted information is the compressed data of images, which has been compressed by the predetermined compression algorithm, and the management computer 3 temporarily stores the compressed data in the storage device and transmits the temporarily stored compressed data synchronously with the data transmission speed of the communication line to the information terminal, which is the cell phone 11 for example, of the user who made access.

Conversion data including the compressed data transmitted to the cell phone 11 as the information terminal of the user is properly decompressed, where the image data is displayed on the display screen 16 and the sound data is subject to D/A conversion and can be output from the earphone terminal port 17.

When a line between the management computer 3 and the monitor terminal 4 is connected first off, the communication line board for monitor terminal 38 in the management computer 3 accepts the IP address and the predetermined ID transmitted from the monitor terminal, conducts searching by the CPU 31 to confirm whether the transmission details are from the registered monitor terminal 4a or not, using the user database (DB) with which many IP addresses which are allocated to monitor terminals and many IDs, are registered, and completes line connection.

Herein, although the ISP allocates IP address to the monitor terminal as described above, and if a self convenience of ISP, power failure, temporary line disconnection or the like occurs, it is often the case that a provider as the ISP re-allocates a new IP address to the monitor terminal when subsequently recovering the always-on connection state next. When such things happen, the IP address as the address of the monitor terminal, which is already registered with the user DB in the management computer, has to be changed. In this embodiment, the MPU 65 in the monitor unit 1 basically controls the communication section 71, but also performs management of the IP addresses (function as an IP address management section shown in FIG. 7) and thus the IP address currently provided is always stored.

When the temporary line disconnection occurs, the MPU 65 is provided with a function that always connects for itself to the global IP address of the management computer 3, which is stored in the internal ROM 66, at the time of re-connection to the Internet similar to the process at the above-described opening connection start, and also has a self connection function capable of requesting the registration of a new IP address.

Specifically, when the IP address is altered, the MPU stores the new IP address to perform update process. Subsequently, it starts connection process for itself to the global IP address of the management computer 3. In performing the connection process, the MPU sends the predetermined ID registered together with the IP address allocated to the monitor terminal, which is recorded in the user database (DB), that is, the monitor terminal ID, to the management computer as a parameter for connection, and requests to register the new IP address.

In the case where the IP address is altered in the connection state, the MPU 65 determines the difference between the current IP address and the newly provided IP address, and when they are different, the MPU has a self connection function that performs connection process for itself to the global IP address of the management computer 3, which is stored in the internal ROM 66, and that can request to register the new IP address.

Specifically, as shown in FIG. 8, the MPU determines whether or not the IP address has been altered as the function of MPU 65. A stand-by state is maintained when the address has not been altered. When the address has been altered, the new IP address is stored to perform the update process. Subsequently, the MPU starts the connection process for itself to the global IP address of the management computer 3. In performing the connection process, the MPU sends the predetermined ID registered together with the IP address allocated to the monitor terminal, which is recorded in the user database (DB), that is, the monitor terminal ID, to the management computer as the parameter for connection, and requests to register the new IP address.

The management computer determines the presence of the parameter for connection that is the monitor terminal ID when starting connection, as shown in FIG. 9. Access is rejected when the parameter for connection has not been sent. When the parameter for connection has been sent and the monitor terminal ID is registered with the user database (DB), the computer performs the connection process. Subsequently, the computer searches and extracts a subject monitor terminal from the user database (DB). Furthermore, the old IP address in the user database (DB) is updated to the new IP address.

Further, when the IP address is altered while the monitor terminal is in the always-on connection state or when re-connection to the Internet can be made, the monitor terminal is provided with the function to perform self connection to the global IP address of the management computer, which is stored inside thereof, and it is also allowed to have a self connection function to request for the update registration of the currently allocated IP address based on its old IP address. In the case of the example, the user database (DB) already stores the old IP address corresponding to the monitor terminal, with which the authentication of the monitor terminal to be connected can be made, so that an update registration request of the IP address may be approved by the authentication.

Note that the management computer 3 may provide service that mainly performs process to join the monitor terminal that has made connection via the Internet and the monitor terminal, where the computer makes connection process to the information terminal of the user, which is the cell phone 11 or the like, and performs data transfer process that it mediates/connects the transmission/receiving of predetermined command data and image (and sound) data, which are severally transmitted from the information terminal of the user. Herein, the management computer 3 conducts guidance service regarding the operation in connecting both parties. For example, allowable time for the Internet connection is given to the user, the computer makes guidance regarding time remained, announcement when connection failure occurred in the monitor terminal, or the like.

When a monitor terminal ID corresponding to the user ID exists, in the step where the management computer reaches out the control section of the monitor terminal based on the extracted monitor terminal information using the communication line network composed of the Internet and the telephone network and the management computer acquires information collected by the monitor terminal 4 via the communication network composed of the Internet and the telephone network, a predetermined error notification that is a message such as "For example, data cannot be collected"

(reasons why the data cannot be collected are considered to be poor Internet connection environment, failure to turn power on, disconnection act by a raider, or the like) is transmitted to the user who made access without disconnecting the communication with the user in a certain time when the management computer 3 confirms a state that connection to the monitor terminal 4 cannot be made or a state that the information from the monitor terminal 4 is not transmitted to the management computer.

The conversion data including the compressed data, which has been transmitted to the cell phone 11 as the information terminal of the user, is properly decompressed where the image data is displayed on the display screen 16 and the sound data is subject to D/A conversion to be output from the earphone terminal port 17. When user A connected to the monitor terminal via the Internet operates a cross key or the like provided on the cell phone 11 in order to change the monitoring direction photographed, the operation data is transmitted to the monitor terminal 4a via the management computer 3 and the relay server 6, control instruction data for the direction change unit 58 based on the transmission is created, and a photograph direction can be properly moved vertically and horizontally in a direction where the user wants to watch. Further, by expanding the hardware or the software of the monitor terminal, various functions are added such as a zoom operation of camera, sound amplification, or outputting the sound, which is from a user terminal, from the monitor terminal through a speaker, or the like. Furthermore, the management computer only executes the Internet connection between those who made access and the monitor terminal, and those who made access may order the information terminal to receive the monitor information after completing the connection.

The present invention has been described according to the drawings, but the present invention is not limited to the embodiment, and it is needless to say that modifications and additions within the scope of the present invention are included in the present invention.

For example, although the monitor terminal 4 is in a shape installable on the ceiling in the embodiment, the present invention is not limited to this, and it is needless to say that the monitor terminal may be a wall-mounting type or an appropriate shape suitable for other installation positions.

Further, although the monitor unit consists of the monitor terminal 1 and the set-top box 2 in the embodiment, they may be housed in one case to constitute the monitor terminal.

Still further, one monitor terminal 1 is connected to the set-top box 2 in the embodiment, but the present invention is not limited to this and a plurality of monitor units 1, to which addresses are severally allocated, may be connected to a same set-top box 2. Furthermore, the monitoring CCD camera 55 with the built-in charge coupled device (CCD) 54 is set as one monitor camera unit, addresses are allocated to a plurality of the monitor camera units, a plurality of the monitor camera units (4aa, 4ab, 4ac, 4ba, and so on) are connected to the monitor unit 1 connected to the set-top box 2, and thus the information of the monitor camera units (4aa, 4ab, 4ac, 4ba, and so on) may be selectively provided to the monitor unit 1.

In the embodiment, the set-top box 2 and the monitor unit 1 are connected by the communication cable 51, but the present invention is not limited to this and the set-top box 2 and monitor unit 1 may be connected by wireless communication such as wireless LAN or the like. The "connection" used here includes all connection including cable and wireless.

Herein, although the monitor unit 1 and the management computer 3 are connected using the ADSL, a CATV line, a dedicated line, and a wireless Internet network can be used as the communication line, through which data transmission/receiving with the management computer 3 is done, in an always-on connection state.

Further, the communication line board for monitor terminal 38 and the communication line for user 33 are individually provided in the embodiment, but the present invention is not limited to this and a same communication line board capable of connecting a large number of lines may be used instead of the boards.

DESCRIPTION OF REFERENCE NUMERALS

1: Monitor unit
2: Set-top box (communication means)
3: Management computer
4a: Monitor terminal (monitoring region a)
4b: Monitor terminal (monitoring region b)
4c: Monitor terminal (monitoring region c)
5: Communication line network
11: Cell phone
14: Personal computer
15: Laptop personal computer
16: Display screen
17: Earphone terminal port
30: Data bus
31: Central processing unit (CPU)
32: RAM
33: Communication line board
34: Display unit
35: Storage device
36: Input unit
37: Real time clock (RTC)
38: Communication line board for monitor terminal
50: Case
51: Communication cable
52: PCM codec
53: Microphone
55: Monitoring CCD camera
56: Digital signal processor (DSP)
58: Direction change unit
59: Driver
65: MPU
66: Internal ROM
67: Battery
68: Cover
69: Pilot lamp (LED)
70: SRAM
71: Communication section

What is claimed is:

1. An information supply system using a management computer that is installed in a communication network composed of the Internet and/or a telephone network,
    said management computer comprising: an user database with which monitor terminal information including an IP address, which is attached to a monitor terminal having at least one monitoring sensor, is registered by corresponding to a user ID, and
    said system further comprising:
    acquiring specific information that is an user ID composed of at least one of following authentication data selected from the group consisting of a telephone number, an ID number, address data, a password and a code of a user who makes access using the communication network composed of the Internet and/or the telephone network;

searching whether or not the acquired specific information corresponds to monitor terminal information that is previously registered with said user database;

reaching out a controller of the monitor terminal by said management computer based on said monitor terminal information associated with said user ID using the communication network composed of the Internet and/or the telephone network when the monitor terminal information corresponding to said specific information exists;

acquiring information, which is collected by said monitor terminal, by said management computer via the communication network composed of the Internet and/or the telephone network;

supplying the information acquired from the monitor terminal to said user who has transmitted said specific information to make access, by said management computer using the communication network composed of the Internet and/or the telephone network;

accepting an IP address alteration request, which is transmitted from a specifiable monitor terminal, and altering an IP address that is a part of said monitor terminal information registered with said user database;

waiting for transmitted data from the monitor terminal within a duration set as a predetermined time, in the step of reaching out the controller of the monitor terminal by the management computer based on said monitor terminal information, and transmitting a predetermined error notification to the user who has made access, if any transmitted data from the monitor terminal cannot be obtained within said duration.

2. The information supply system using the communication network according to claim 1, wherein said management computer, when accepting the IP alteration request from the monitor terminal, has a step of accepting a monitor terminal ID registered with said user database and approving the IP alteration request only when the monitor terminal ID is registered.

3. The information supply system using the communication network according to claim 2, wherein said monitor terminal has a detecting function of the difference between an old IP address and a newly provided IP address, and has a self connection function to connect to a global IP address of the management computer, which is stored inside said monitor terminal, if a newly provided IP address is different from an old IP address, and to request for an update registration of the new IP address based on a self monitor terminal ID, when an IP address is replaced with another IP address while the monitor terminal is in an always-on connection state.

4. The information supply system using the communication network according to claim 2, wherein the monitor terminal is provided with a function to connect to a global IP address of the management computer, which is stored inside thereof, and has a self connection function to request for an update registration of a currently attached IP address based on the self monitor terminal ID, when the monitor terminal is connected first or re-connected to the Internet.

5. The information supply system using the communication network according to claim 2, wherein the monitor terminal is provided with a function to connect to a global IP address of the management computer, which is stored inside thereof, and has a self connection function to request for the update registration of a currently attached IP address based on a self old IP address, when an IP address is replaced with another IP address while the monitor terminal is in an always-on connection state or when the monitor terminal is reconnected to the Internet.

6. The information supply system using the communication network according to claim 1, wherein the management computer, when the user accesses the computer and there are a plurality of monitor terminals or monitor units corresponding to the user after searching the monitor terminal ID from said user database, displays a type and/or a menu regarding accessible monitor terminals or monitor units to the user to prompt him/her to select information he/she wants.

7. The information supply system using the communication line according to claim 1, wherein, when said management computer acquires information, which is collected by said monitor terminal, via the communication network composed of the Internet and/or the telephone network, the transmitted information is the compressed data of an image compressed by a predetermined compression algorithm, and said management computer temporarily stores the compressed data in a storage device and transmits said compressed data synchronously with the data transmission speed of a communication line to an information terminal of the user.

8. The information supply system using the communication network according to claim 3, wherein the monitor terminal is provided with a function to connect to a global IP address of a management computer, which is stored inside thereof, and has a self connection function to request for an update registration of a currently attached IP address based on the self monitor terminal ID, when the monitor terminal is connected first or re-connected to the Internet.

9. The information supply system using the communication network according to claim 2, wherein the management computer, when the user accesses the computer and there are a plurality of monitor terminals or monitor units corresponding to the user after searching the monitor terminal ID from said user database, displays a type and/or the menu regarding accessible monitor terminals or monitor units to the user to prompt him/her to select information he/she wants.

10. The information supply system using the communication network according to claim 3, wherein the management computer, when the user accesses the computer and there are a plurality of monitor terminals or monitor units corresponding to the user after searching the monitor terminal ID from said user database, displays a type and/or the menu regarding accessible monitor terminals or monitor units to the user to prompt him/her to select information he/she wants.

11. The information supply system using the communication network according to claim 4, wherein the management computer, when the user accesses the computer and there are a plurality of monitor terminals or monitor units corresponding to the user after searching the monitor terminal ID from said user database, displays the type and/or the menu regarding accessible monitor terminals or monitor units to the user to prompt him/her to select information he/she wants.

12. The information supply system using the communication network according to claim 5, wherein the management computer, when the user accesses the computer and there are a plurality of monitor terminals or monitor units corresponding to the user after searching the monitor terminal ID from said user database, displays the type and/or the menu regarding accessible monitor terminals or monitor units to the user to prompt him/her to select information he/she wants.

13. The information supply system using the communication network according to claim 1, wherein the monitoring sensor is selected from the group consisting of a camera, a video-camera, a temperature sensor, an audio sensor, and a smoke sensor.

14. The information supply system using the communication network according to claim 1, wherein the user access the communication network by using an information terminal that is selected from the group consisting of a laptop computer, a personal desktop computer, and a cell phone.

15. An information supply system using a management computer that is installed in a communication network composed of the Internet and/or a telephone network, said management computer comprising: an user database with which monitor terminal information including an IP address, which is attached to a monitor terminal having at least one monitoring sensor, is registered by corresponding to a user ID, and said system further comprising:

acquiring specific information that is an user ID composed of at least one of following authentication data selected from the group consisting of a telephone number, an ID number, address data, a password and a code of a user who makes access using the communication network composed of the Internet and/or the telephone network;

searching whether or not the acquired specific information corresponds to monitor terminal information that is previously registered with said user database;

reaching out a controller of the monitor terminal by said management computer based on said monitor terminal information associated with said user ID using the communication network composed of the Internet and/or the telephone network when the monitor terminal information corresponding to said specific information exists;

acquiring information, which is collected by said monitor terminal, by said management computer via the communication network composed of the Internet and/or the telephone network;

supplying the information acquired from the monitor terminal to said user who has transmitted said specific information to make access, by said management computer using the communication network composed of the Internet and/or the telephone network; and accepting an IP address alteration request, which is transmitted from a specifiable monitor terminal, and altering an IP address that is a part of said monitor terminal information registered with said user database;

wherein said management computer transmits a predetermined error notification to the user who has made access when the computer has confirmed a state where connection to the monitor terminal was impossible or a state where information from the monitor terminal was not transmitted to said management computer.

16. The information supply system using the communication network according to claim 15, wherein said management computer, when accepting the IP alteration request from the monitor terminal, has a step of accepting a monitor terminal ID registered with said user database and approving the IP alteration request only when the monitor terminal ID is registered.

17. The information supply system using the communication network according to claim 16, wherein said monitor terminal has a detecting function of the difference between an old IP address and a newly provided IP address, and has a self connection function to connect to a global IP address of the management computer, which is stored inside said monitor terminal, if a newly provided IP address is different from an old IP address, and to request for an update registration of the new IP address based on a self monitor terminal ID, when an IP address is replaced with another IP address while the monitor terminal is in an always-on connection state.

18. The information supply system using the communication network according to claim 16, wherein the monitor terminal is provided with a function to connect to a global IP address of the management computer, which is stored inside thereof, and has a self connection function to request for an update registration of a currently attached IP address based on the self monitor terminal ID, when the monitor terminal is connected first or re-connected to the Internet.

19. The information supply system using the communication network according to claim 16, wherein the monitor terminal is provided with a function to connect to a global IP address of the management computer, which is stored inside thereof, and has a self connection function to request for the update registration of a currently attached IP address based on a self old IP address, when an IP address is replaced with another IP address while the monitor terminal is in an always-on connection state or when the monitor terminal is reconnected to the Internet.

20. The information supply system using the communication network according to claim 15, wherein the management computer, when the user accesses the computer and there are a plurality of monitor terminals or monitor units corresponding to the user after searching the monitor terminal ID from said user database, displays a type and/or a menu regarding accessible monitor terminals or monitor units to the user to prompt him/her to select information he/she wants.

21. The information supply system using the communication line according to claim 15, wherein, when said management computer acquires information, which is collected by said monitor terminal, via the communication network composed of the Internet and/or the telephone network, the transmitted information is the compressed data of an image compressed by a predetermined compression algorithm, and said management computer temporarily stores the compressed data in a storage device and transmits said compressed data synchronously with the data transmission speed of a communication line to an information terminal of the user.

22. The information supply system using the communication network according to claim 17, wherein the monitor terminal is provided with a function to connect to a global IP address of a management computer, which is stored inside thereof, and has a self connection function to request for an update registration of a currently attached IP address based on the self monitor terminal ID, when the monitor terminal is connected first or re-connected to the Internet.

23. The information supply system using the communication network according to claim 16, wherein the management computer, when the user accesses the computer and there are a plurality of monitor terminals or monitor units corresponding to the user after searching the monitor terminal ID from said user database, displays a type and/or the menu regarding accessible monitor terminals or monitor units to the user to prompt him/her to select information he/she wants.

24. The information supply system using the communication network according to claim 17, wherein the management computer, when the user accesses the computer and there are a plurality of monitor terminals or monitor units corresponding to the user after searching the monitor terminal ID from said user database, displays a type and/or the menu regarding accessible monitor terminals or monitor units to the user to prompt him/her to select information he/she wants.

25. The information supply system using the communication network according to claim 18 wherein the management computer, when the user accesses the computer and there are a plurality of monitor terminals or monitor units corresponding to the user after searching the monitor terminal ID from said user database, displays the type and/or the menu regarding accessible monitor terminals or monitor units to the user to prompt him/her to select information he/she wants.

26. The information supply system using the communication network according to claim 19, wherein the management computer, when the user accesses the computer and there are a plurality of monitor terminals or monitor units corresponding to the user after searching the monitor terminal ID from said user database, displays the type and/or the menu regarding accessible monitor terminals or monitor units to the user to prompt him/her to select information he/she wants.

27. The information supply system using the communication network according to claim 15, wherein the monitoring sensor is selected from the group consisting of a camera, a video-camera, a temperature sensor, an audio sensor, and a smoke sensor.

28. The information supply system using the communication network according to claim 15, wherein the user access the communication network by using an information terminal that is selected from the group consisting of a laptop computer, a personal desktop computer, and a cell phone.

* * * * *